July 10, 1956 K. FRANK 2,754,434
MAGNETIC PICKUP MEANS
Filed Feb. 10, 1954
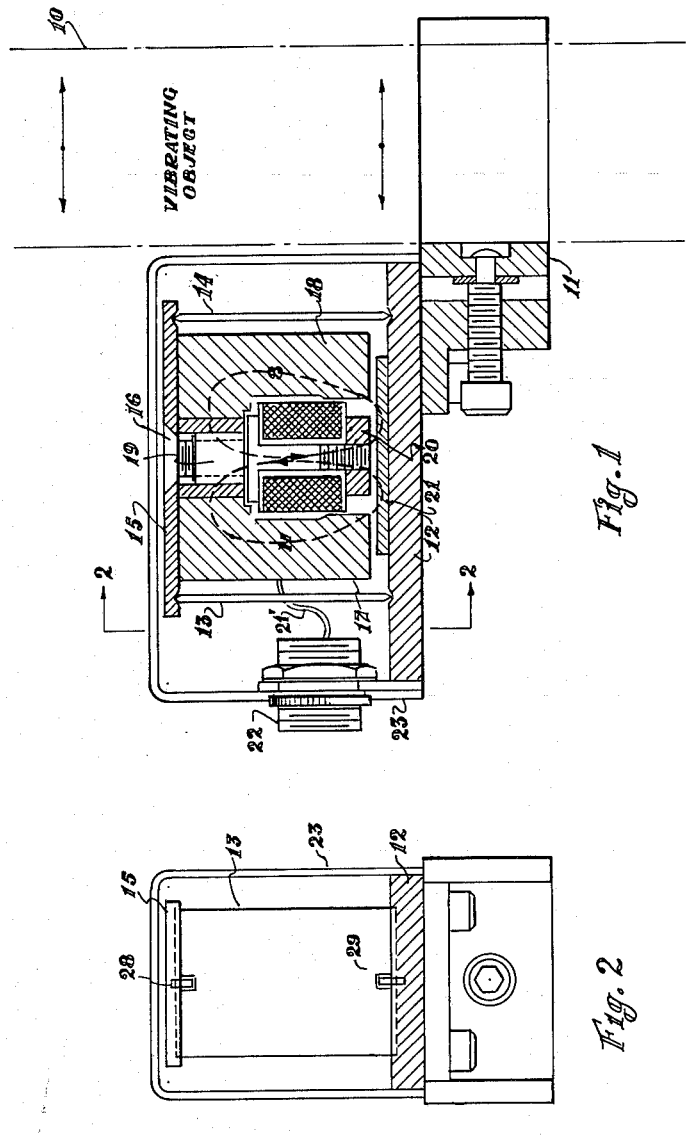
INVENTOR.
KARL FRANK

United States Patent Office 2,754,434
Patented July 10, 1956

2,754,434

MAGNETIC PICKUP MEANS

Karl Frank, Garden City, N. Y., assignor to Micro Balancing, Inc., New Hyde Park, N. Y.

Application February 10, 1954, Serial No. 409,384

3 Claims. (Cl. 310—15)

This invention relates to means for measuring vibration and more particularly, to such means adapted to be set on the vibratory object under test.

Conventional vibration measuring devices are generally separately mounted from the vibrating object or are hand held adjacent the vibrating object with a movable probe contacting the object. This arrangement causes difficult mounting problems.

The present invention is an oscillatory pickup adapted to be set on top of the vibrating object or on a shelf connected thereto. This eliminates the need for separate mounting or for a contacting probe.

The present invention comprises a magnetic pickup which is seismically mounted so that when the pickup is placed on the vibrating object, the base will vibrate with the object relative to the suspended magnetic pickup coil, which will remain substantially stationary in one place due to the method of mounting.

Accordingly, a principal object of the invention is to provide new and improved magnetic pickup means.

Another object of the present invention is to provide new and improved vibration measuring means constructed without any springs, or any other resonant parts.

Another object of the present invention is to provide new and improved magnetic pickup means having a low resonant frequency.

Another object of the present invention is to provide new and improved magnetic pickup means comprising a bottom plate having a pair of notches, a pair of side members having knife edges resting on said notches, a top member having a second pair of notches, said top member resting on said side members, a U shaped permanent magnet and a coil mounted on a pole in the center of said U shaped magnet, whereby the bottom plate will vibrate relative to the magnetic pickup thereby inducing a voltage in said coil.

These and other objects of the invention will be apparent from the following specification and drawings of which:

Figure 1 is a side view partially in section of an embodiment of the invention mounted on a vibrating object.

Figure 2 is a sectional view of Figure 1 taken along the lines 2—2.

Referring to Figure 1, the object 10 represents a vibrating body which is oscillating in the direction shown by the arrows. The oscillatory pickup of the present invention is mounted on the vibrating object by means of the clamp member 11. Alternatively, the magnetic pickup may be set on top of the vibrating object if the top is available or accessible.

The magnetic pickup of the present invention comprises a bottom plate 12 which is substantially rectangular. A pair of side members 13 and 14 mounted as shown and a top member 15 is mounted on the side members 13, 14. The side members are of non-magnetic material such as aluminum and have sharpened edges on the top and bottom. These sharpened edges rest in notches in the top and bottom members.

Pins 28 and 29 are set in the top and bottom members and cooperate with notches in the side members to keep the side members centered.

A U shaped permanent magnet is connected to the top plate 15 by means of the bolt 16. The U shaped core has two large Alnico magnet poles 17 and 18 and then a center pole 19 of soft iron, upon which is mounted a coil 20. Therefore, there are magnetic circuits established through the magnets 17 and 18 and the plate 21 which is mounted on the bottom plate 12 as shown by the dotted lines. The magnetic circuits are quite strong and as a matter of fact, balance the structure comprising the top, bottom and side plates. It will be seen that this structure is mechanically unstable by itself due to the knife edge mounting and would tip over like a house of cards were it not for the magnetic field.

Advantage is taken of this magnetically balanced mounting to provide a seismic pickup. The output of the pickup coil is connected by the lead 21 to the output plug 22 which is mounted on the case 23.

The magnetic fields are strong enough so that the device will operate upside down. This enables it to be clamped to the bottom of a device under test if necessary.

The operation of the device is as follows:

As the vibrating object 10 vibrates, the bottom plates 12 and 21 will vibrate with it, but the top plate assembly including the magnet means which is so delicately balanced on the knife edges of the side members 13 and 14, will remain substantially stationary. Therefore, there will be relative movement between the magnetic member and the plate 20 which will induce a voltage in the coil 20. This voltage will have frequency and amplitude proportional to the oscillation of the vibrating object.

The dotted lines show two separate magnetic circuits which buck or oppose each other in the center pole. When the pickup is centered, the magnetic fields substantially cancel each other, but when the magnet moves, there will be a differential magnetic field threading the coil, and inducing a voltage in the coil.

The pickup is sensitive to vibration in only one plane and is not affected by other modes of vibration.

I claim:

1. Seismic pickup means comprising a bottom plate having a first pair of straight parallel spaced notches, a magnetic plate mounted between said notches on said bottom plate, a pair of side members resting in said notches, a top member having a second pair of straight parallel notches, the top of said side members resting is said second notches, a U shaped permanent magnet having a soft iron center pole, said magnet being connected to said top plate between said second notches and forming a magnetic circuit with said bottom magnetic plate, said side members being long enough to provide an air gap between the ends of the magnet and said magnetic plate and the span of said permanent magnet being greater than the length of said magnetic plate, and a coil mounted on said center pole, whereby said magnetic core may vibrate relative to said magnetic plate on said bottom plate and thereby induce a voltage in said coil.

2. Magnetic pickup means comprising a bottom plate having a first pair of straight parallel notches, a magnetic plate mounted between said notches on said bottom plate, a pair of non-magnetic side members resting in said notches, a top member having a second pair of straight parallel notches, the top of said side members resting in said second notches, an E shaped permanent magnet having a soft iron center pole, said magnet being connected to said top plate between said second notches and forming a magnetic circuit with said bottom magnetic plate, said side members being long enough to provide an air gap between the ends of the magnet and said magnetic plate and the span of said permanent magnet being greater than the length of said magnetic plate, and a coil mounted on said center pole, whereby said magnetic core may vibrate relative to said magnetic plate on said bottom plate and thereby induce a voltage in said coil, said magnet being strong enough so that said pickup means may operate upside down.

3. Magnetic pickup means comprising a bottom plate having a first pair of straight parallel notches, a top member having a second pair of straight parallel notches, a magnetic plate between said notches on said bottom plate, a pair of knife edged non-magnetic side members resting in said notches, the top of said side members resting in said second notches, a U shaped permanent magnet having a soft iron center pole, said magnet being connected to said top plate between said second notches forming a magnetic circuit with said bottom magnetic plate of sufficient strength to balance said top member, said side members being long enough to provide an air gap between the ends of the magnet and said magnetic plate and the span of said permanent magnet being substantially as great as the length of said magnetic plate, a coil mounted on said center pole, whereby said magnetic core may vibrate relative to said magnetic plate on said bottom plate and thereby induce a voltage in said coil, having amplitude and frequency proportional to said vibration.

References Cited in the file of this patent

UNITED STATES PATENTS

| | | |
|---|---|---|
| 2,084,561 | Prescott et al. | June 22, 1937 |
| 2,595,067 | Flint | Apr. 29, 1952 |

FOREIGN PATENTS

| | | |
|---|---|---|
| 620,166 | Great Britain | Mar. 21, 1949 |